(Model.)

6 Sheets—Sheet 1.

D. O. PAIGE.
SAFE.

No. 361,540. Patented Apr. 19, 1887.

WITNESSES
Jno. E. Wiley
N. B. Dogherty

INVENTOR
David O. Paige
By W. W. Seggs
Attorney (Model.)

D. O. PAIGE.
SAFE.

No. 361,540. Patented Apr. 19, 1887.

6 Sheets—Sheet 2.

WITNESSES
Jno. E. Wiles
Th. B. Dogherty

INVENTOR
David O. Paige
By W. W. Leggett,
Attorney (Model.)

D. O. PAIGE.
SAFE.

No. 361,540. Patented Apr. 19, 1887.

WITNESSES
Jno. E. Wiles.
Th. B. O'Dogherty.

INVENTOR
David O. Paige
By W. W. Leggett
Attorney (Model.) 6 Sheets—Sheet 4.
D. O. PAIGE.
SAFE.
No. 361,540. Patented Apr. 19, 1887.
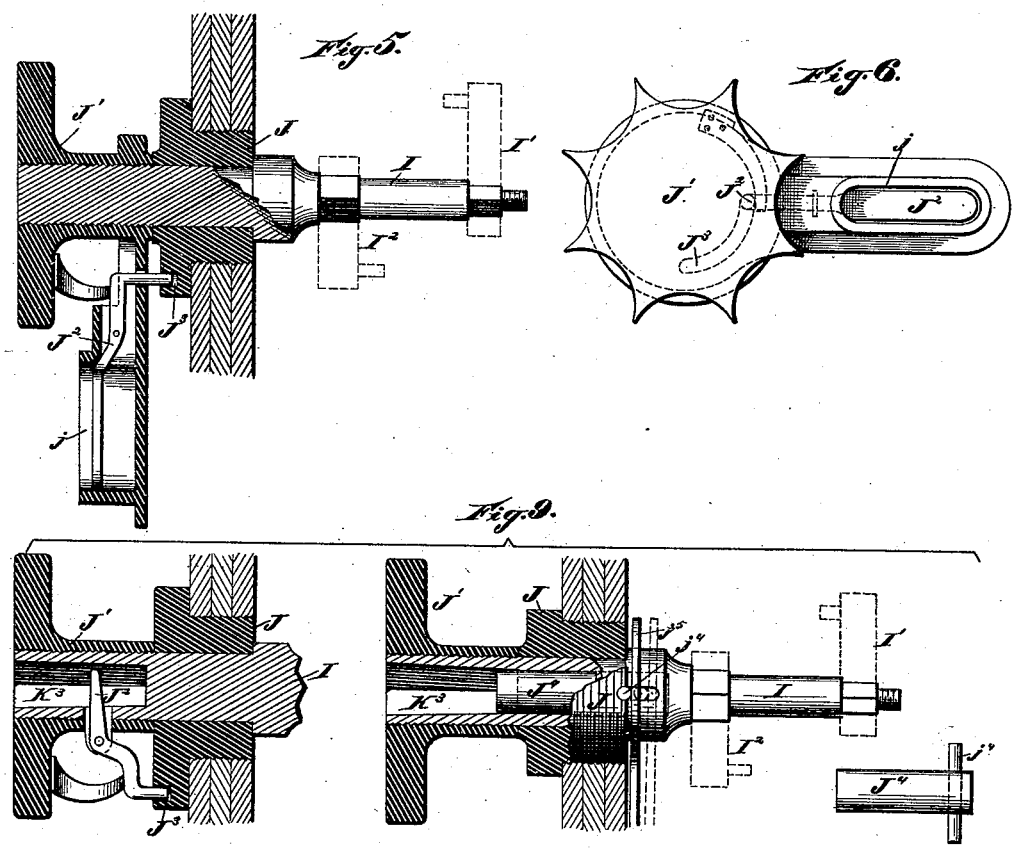
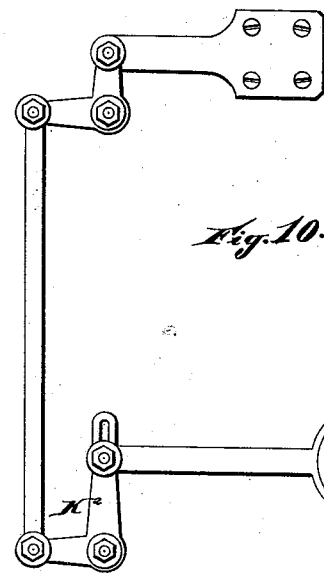
WITNESSES
Jno. E. Wiles
M. B. O'Dogherty
INVENTOR
David O. Paige
By W. W. Leggett
Attorney

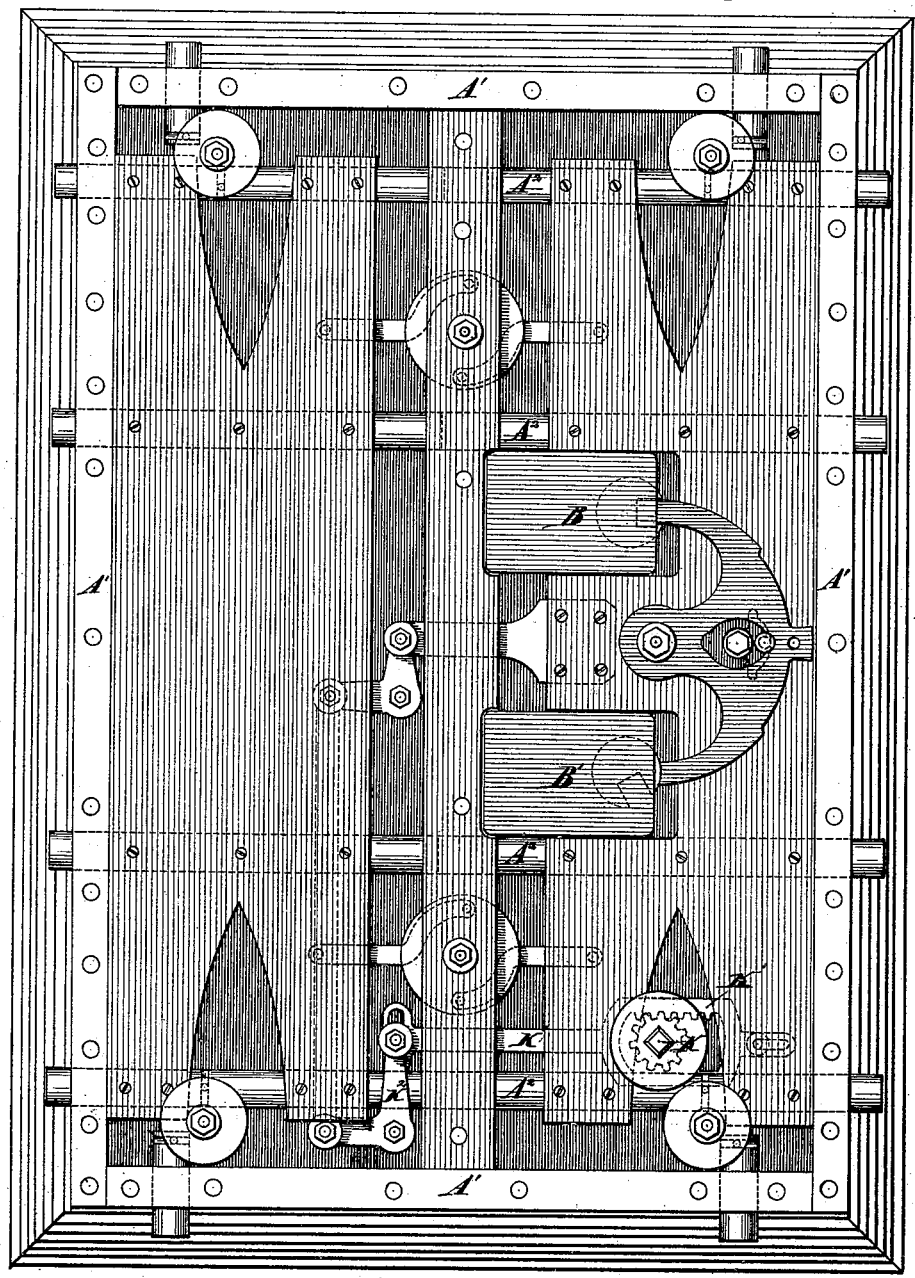

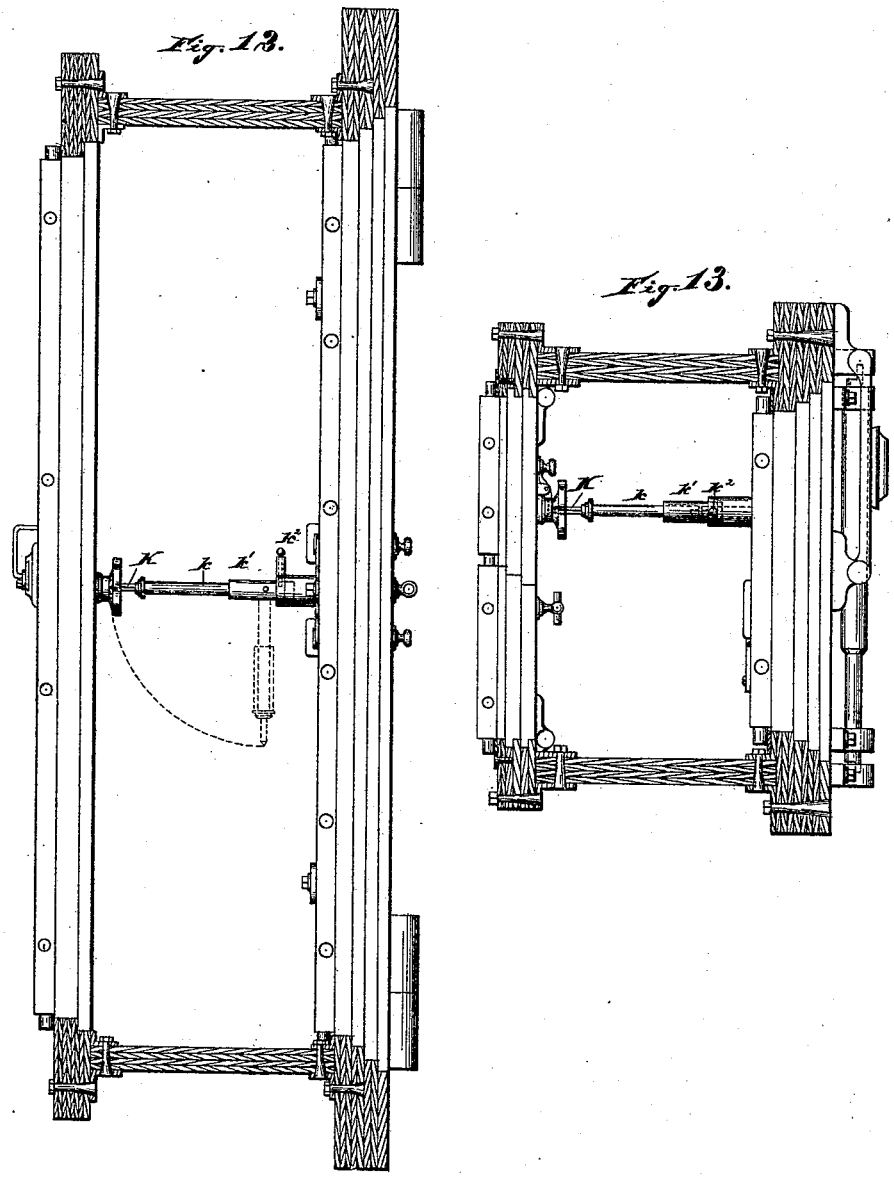

United States Patent Office.

DAVID O. PAIGE, OF DETROIT, MICHIGAN.

SAFE.

SPECIFICATION forming part of Letters Patent No. 361,540, dated April 19, 1887.

Application filed October 17, 1885. Serial No. 180,185. (Model.)

*To all whom it may concern:*

Be it known that I, DAVID O. PAIGE, of Detroit, county of Wayne, State of Michigan, have invented a new and useful Improvement in Safes; and I declare the following to be a full, clear, and exact description of the same, such as will enable others skilled in the art to which it pertains to make and use it, reference being had to the accompanying drawings, which form a part of this specification.

My invention consists of the combinations of devices and appliances hereinafter specified, and more particularly pointed out in the claims.

The object of my invention is, first, to provide a safe having outside and inside doors with a time-lock mechanism located within said safe, and preferably attached to the inside surface of the inside door, the said time mechanism adapted to dog the bolt-work of the outside door or doors; second, to provide a time-lock mechanism upon the inside of the safe, and preferably attached to the inside surface of the inner door, and adapt the same to dog the bolt-work of both the outside and the inside doors; third, to combine with a safe a time-lock mechanism located upon the interior thereof, and preferably attached to the interior surface of an inside door, said mechanism adapted to dog the bolt-work of the outside and inside doors, and in connection therewith combination-lock mechanism connected with each of said doors, the construction being such that the combination-locks of either of said doors may be employed independently of each other and independently of the time mechanism; fourth, to provide a safe with time-lock mechanism upon the inside thereof, and preferably attached to the inside surface of an inside door, and in connection therewith combination-lock mechanism upon either or both the outside and inside doors, the construction being such that the bolt-work of the inside door or that of both the inside and outside doors may be held in their locked position wholly by the time-lock mechanism without the employment of the combination-lock mechanism of either door.

Figure 1:
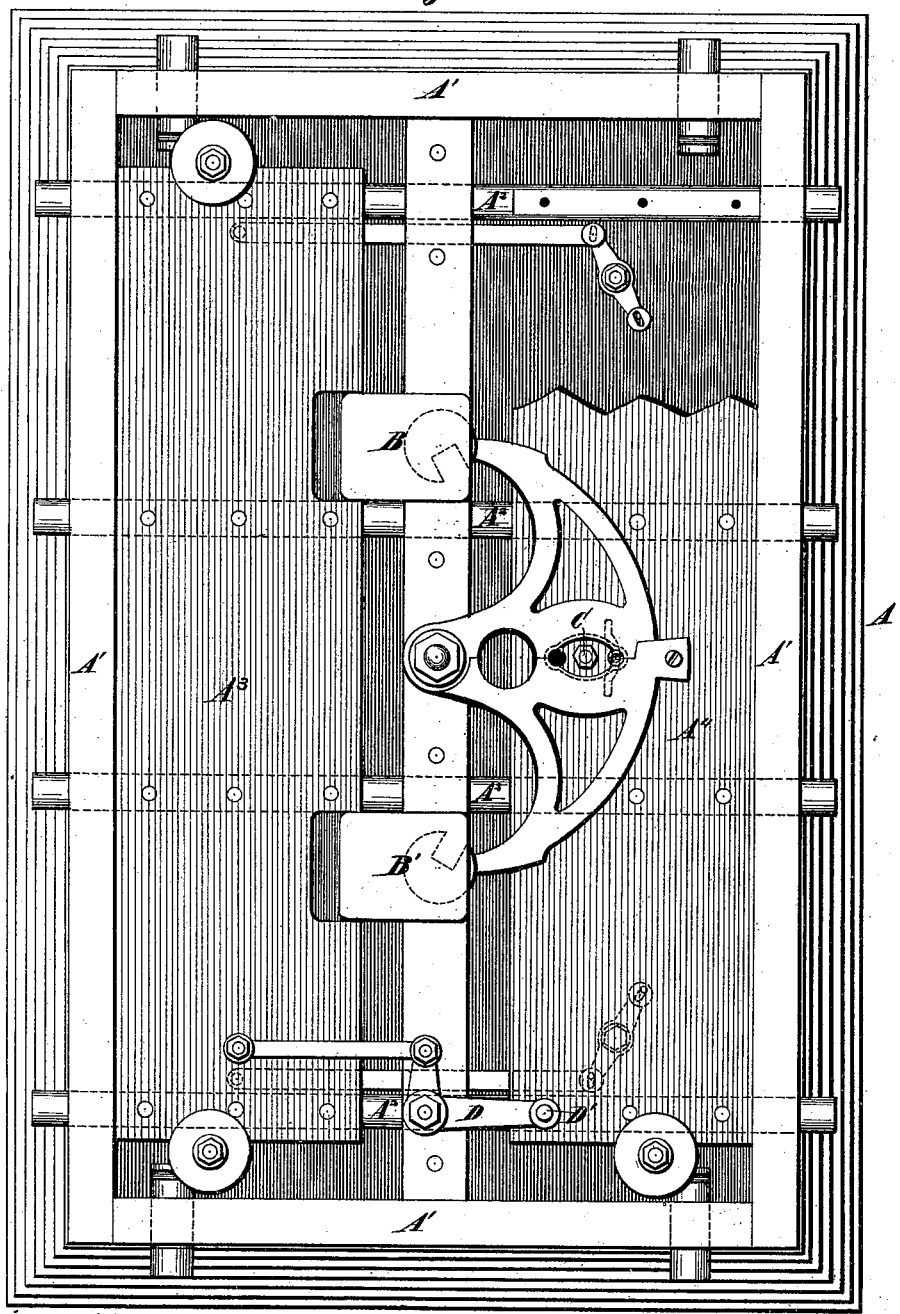
Figure 2:
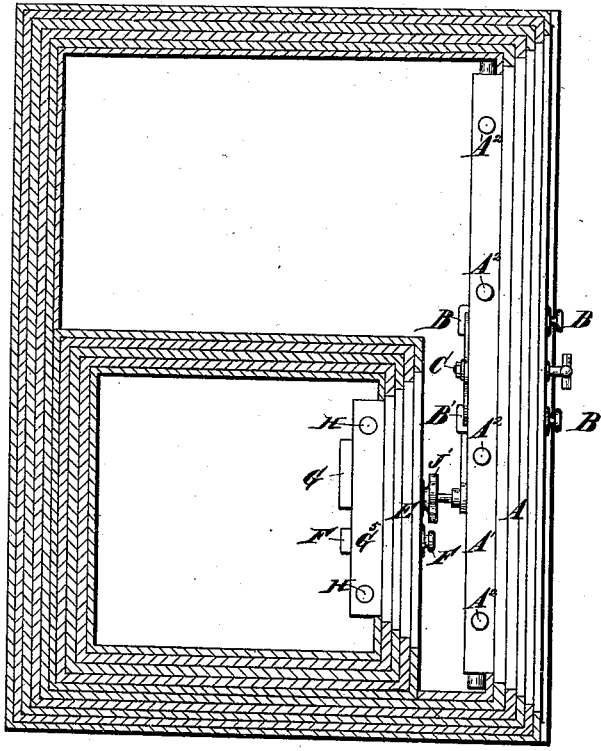
Figure 3:
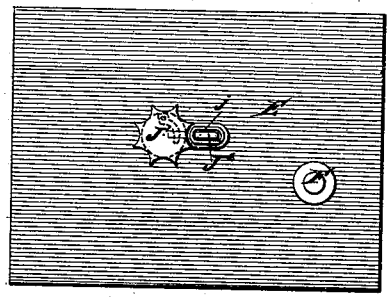
Figure 11:
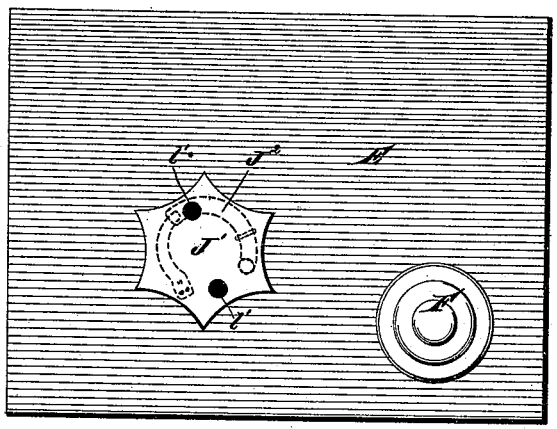
Figure 4:
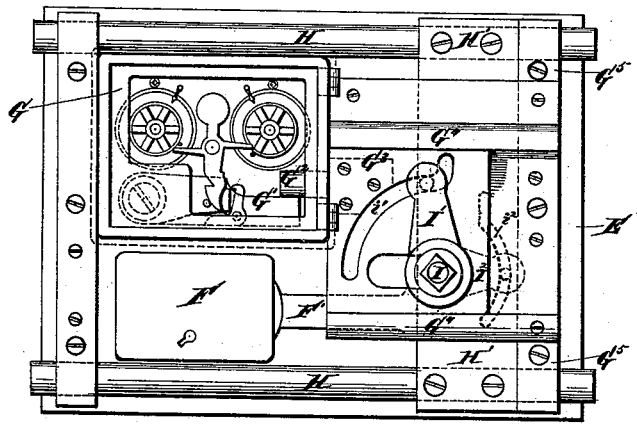
Figure 7:
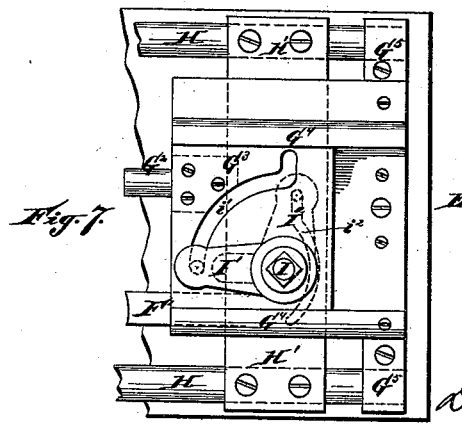

In the drawings, Figure 1 represents the inside of the outside door. Fig. 2 represents a cross-section of the safe, illustrating the outside door and inside door and time mechanism located upon the interior of the inside door. Fig. 3 is a face view of the outside of the inside door. Fig. 4 is a face view of the inside surface of the inside door, the latter illustrating in connection therewith a Sargent time-lock. Fig. 5 is a detail view of the arbor mechanism of the inner door. Fig. 6 is a face view of the arbor shown in Fig. 5. Fig. 7 shows the position of the arms of the arbor of the inner door when its bolts are in an unlocked position. Fig. 8 is an inside view of an outside door, illustrating a variation of the invention. Fig. 9 presents variations in the form of arbor of the inner door, showing the same adapted to receive a key or projection from the outer door, which is caused to simply rotate about its own axis. Fig. 10 shows a variation in which a disk with projecting pins is employed instead of the key shown in Fig. 8. Fig. 11 shows the arbor of the inner door adapted to engage with the pins of the disk shown in Fig. 10. Figs. 12 and 13 represent, respectively, in elevation and plan, the device as adapted to a vault.

A represents the outside door of a safe; A', its bolt-straps; $A^2$, its train-bolts, coupled together by plates $A^3$ and $A^4$. B and B' are its combination-locks.

C is the inner end of the arbor by which the train-bolts are thrown.

I will not here describe the mechanism whereby the train-bolts are thrown, because the same is immaterial to this invention, the invention being adapted for employment with any kind of bolt-work mechanism.

D represents an arm of a bell-crank lever, provided with a projecting pin, D', at its free end. This lever will rotate about its pivot as the train-bolts are moved in either direction, as shown.

E is an inner door of the safe. It is, like the outer door, preferably provided with combination-lock mechanism F.

G is a time-lock of any suitable construction. That shown in the drawings represents an ordinary Sargent time-lock. G' is its locking-bolt.

$G^2$ is a tongue-piece which enters the time-lock mechanism, to operate in connection with the bolt G' of the time-lock. The tongue-piece $G^2$ is attached to a plate, $G^3$, which slides in guides $G^4$ upon another plate, which is attached by screws or otherwise to the bolt-strap G⁵.

H represents the train-bolts of the inner door coupled by a plate, H'.

I is the inner end of the arbor which throws the train-bolts of the inner door. This arbor is provided with two lever-arms, I' I², the former provided with a pin which engages a slot, i', in the sliding plate G³, while the other has a pin engaging within a slot, i², in the coupling-bar H', which unites the two bolts.

F' is the tongue-piece connected with the coupling-bar H', which is adapted to enter the throats of the tumblers in the combination-lock.

The arbor I (shown in Fig. 5) passes through the door and through a collar, J, and terminates with a disk or handle, J', whereby the arbor may be rotated about its axis within the collar J. A spring-pawl, J², is connected with the disk or handle, and engages with a concentric slot, J³, in the stationary collar J.

The operation of the device will now be understood, and is as follows: Referring to Figs. 4 and 7, suppose both the inner door and the outer door of the safe to be open. The operator first closes the inner door, the train-bolts being in the unlocked position, and the levers I' I² will be in the position shown in Fig. 7. He then turns the arbor to the right; and, as he turns the arbor, it will be observed, the pin projecting from the arm I² of the arbor will operate to force the coupling-bar H forward, so as to throw the train-bolts into their locked position. During this operation the pin projecting from the arm I' will have an idle motion in the concentric portion of the slot i', so as not to move the tongue-piece G² out from the time-lock. The arbor and its levers I' I² will then have the position shown in Fig. 4 and the pawl J² will have traveled to the extremity of the annular slot J³. (Shown in Fig. 6.) At this time the combination F of the inner door may be locked. Now, when the arbor I of the inner door is in this position, the outer door is closed, and, in closing, the pin D' of the bell-crank D projects into the opening j of the disk or handle J' of the arbor of the inner door. As it enters the opening j it presses the free end of the pawl J² and raises its other end out of engagement with the slot J³, so as to permit the arbor I of the inner door to be turned farther about its axis. This is accomplished by simply turning the arbor of the outer door so as to throw its train-bolts into their locked position, after which its combination-lock may be set. Now, referring to Fig. 4, it will be noticed that this further rotation of the arbor I will cause the projecting pin from the arm I' to slide the plate G³ and the tongue-piece G² to the right until it has passed beyond the end of the bolt G' of the time-lock, which bolt springs up in front of the tongue-piece and prevents its retraction until the bolt G' is released by the time mechanism. During this movement of the plate G to the right it will be observed that the pin projecting from the arm I² has had an idle motion within the slot i², so that while it holds the train-bolts H in their locked position, it does not produce any movement of the said train-bolts. I have thus accomplished the location of the time-lock upon the interior of an inside door of the safe and have provided means whereby its bolt may serve to dog and hold in their locked position the train-bolts of the inner door, and also the train-bolts of the outer door, so that neither of them can be unlocked until the time mechanism has released them. It is also apparent that the time-lock serves, without the intervention of the combination-locks of either the inner or outer doors, to thus lock or dog the train-bolts of both said doors, yet permitting either or both of said doors to be also locked by their respective combination-locks, if desired. It will be noticed, again, that the inner door may be locked with the time-lock without closing the outer door should any accident to the outer door or other circumstance render it desirable. This is accomplished by first throwing the train-bolts of the inner door into their locked position, as before described, and then with the finger the spring-pawl J² is depressed, so as to disengage its opposite end from the slot J³. The disk can then be turned by hand, so as to withdraw the tongue-piece from the time-lock, in the same manner that it would otherwise be turned by the pin D' of the outer door.

The method of applying this invention admits of many variations, which will readily suggest themselves to the safe-maker or other mechanic. Thus, instead of employing the bell-crank, with its pin D', as shown in Fig. 1, for actuating the arbor of the inner door, this might be accomplished as shown in Fig. 8, in which K is an angular key projecting from a pinion which is attached to the inside face of the door, and a rack-bar, K', connected with a bell-crank, K², serves to rotate the pinion as the train-bolts of the outer door are thrown into their locked position. This projecting key K may enter an angular orifice, K³, of the arbor of the inner door as the outer door is closed, as shown in Fig. 9. This key may act upon any suitable spring-pawl, so as to disengage the same, as before described, and permit the said arbor to further turn and withdraw the tongue-piece from the time-lock as the train-bolts of the outer door are thrown into their locked position. Two varieties of spring-pawl mechanism for use with such a projecting key, K, are shown in Fig. 9, one of which employs a spring-lever, J², and the other employs a plunger, J⁴, having a projecting pawl, j⁴, the same held in engagement with the collar J by a spring, j⁵. In both cases the purpose of the pawl is to stop the rotation of the arbor I as soon as it shall have rotated far enough to throw the train-bolts of the inner door into their locked position, and then leave the arbor in the exact position necessary for receiving the projecting pin D' or projecting key K of the outer door when that door is closed. So, also, as shown in Fig. 10, the key last referred to may be dispensed with, and, instead thereof, a disk, L, be connected to the said pinion and provided with projecting pins $l$, which may enter orifices $l'$ (shown in Fig. 11) in the arbor of the inner door and there be made to depress the spring-pawl $J^2$, disengaging the same, and subsequently turning the arbor, as above described, as the train-bolts of the outer door are thrown into their locked position.

Owing to the space usual between the inside and outside doors of a vault, the construction may be slightly modified, although the principle is precisely the same. Thus, in Fig. 12 is represented an elevation, and in Fig. 13 a view in plan, illustrating the device as attached to the outside and inside doors of a vault. In that case the key K, above explained, is provided with an extension, $k$, and a sliding sleeve, $k'$, adapted to be held in place by a latch, $k^2$, the construction being such that when the outer door is open the sleeve may be released and slid back, thus permitting the key K and its arm to be folded down out of the way. In all other respects the construction is similar to the other constructions heretofore explained.

For the general purposes of safe construction and as best adapted to meet the various locations of the time-lock within the safe inside of the inner door, I prefer usually, though not necessarily, to employ some form of the bell-crank or toggle lever for deriving the necessary motion for turning the arbor of the inner door, because these bell-crank or toggle levers can be readily located at almost any point and be connected to the train-bolt mechanism so as to give to the arm the proper motion and with very little expense.

I have described the time-lock as located upon the inside surface of the inner door; but I would have it understood that, instead of being attached to the door, it may with equal facility be attached to a partition or shelving within the inner safe in such position that when the inner door is closed it will have the proper relation to the train bolt mechanism to dog the same.

The advantages possessed by a safe embodying my invention consist in the double security afforded by the time-lock. Heretofore such time-locks have been located upon the interior side of the outside door, but in this situation were liable to injury by concussions from without. To overcome this they have been placed upon springs or upon separate supports, or upon the exterior surface of the inner door, so that they might not be injured by such concussions. In all cases, however, should the outside door be forced, the inner door would then afford only its combination-lock as an obstruction to the cracksman. By employing my invention, however, with a time-lock located within the inner safe, and either upon its inner wall or upon a partition or other separate interior support, it is caused to operate with equal effect, locking or dogging the train-bolts of the outside door, and is perfectly free from all danger of injury from concussions upon the exterior. Again, if the cracksman succeeds in forcing the outer door, he still finds the inner door fully guarded in like manner by the time-lock.

One purpose of the pawl $J^2$ being caused to enter an orifice or slot, $J^3$, is to limit the motion of the arbor I to that which is sufficient to throw the train-bolts of the inner door into their locked position, for otherwise a party might accidentally turn the arbor too far and so bring the time mechanism into operation at a period when he did not so intend. The slot and pawl, however, serve to prevent such an accident, and the handle can only be turned farther by first pressing with the finger or otherwise the spring-pawl, so as to release it from this engagement with the slot.

I would have it understood that my invention is not limited to any particular mechanism whereby the motion of the arbor of the exterior door is made operative for setting the time-lock—i. e., bringing it into operation for holding the train-bolts in their locked position; but my invention contemplates any suitable arrangement of mechanism which shall so associate the train-bolts of the outer and inner doors with the time-lock located within the inner door that the said time-lock may accomplish the purpose of securing in locked position the bolt-work of the outer or inner and outer doors.

I would also have it understood that the invention is not necessarily limited to a safe having an inner and outer door, but is clearly applicable to safes having outer doors and inner doors and an interior strong-box, and the time-lock may be located upon the interior of this third compartment and operate to guard the train-bolts of all three series of doors, it only being necessary to duplicate the mechanism for throwing the train-bolts on the intermediate and the interior doors. I would therefore have such a construction regarded as the mechanical equivalent of its use upon two doors or sets of doors.

In each instance where the inner arbor is rotated by a projection from the mechanism of the outer door, it will be noticed that the projection simply strikes a yielding spring-lever, and there is space beyond the lever, so as to permit the said projection to pass beyond without coming into contact with any rigid portion of the arbor or inner door. This construction overcomes any liability of injury by a concussion upon the exterior of the outer door, which might otherwise be conveyed to the inner door through the medium of the projection which enters this arbor.

What I claim is—

1. The combination, with a safe or vault having interior and exterior doors, of time-lock mechanism located within the compartment secured by the inner door, and means whereby said time-lock mechanism may secure the train-bolts of the outer door in a locked position, substantially as described.

2. The combination, with a safe or vault having an outer door provided with train-bolt mechanism and an inner door closing an inner compartment, of a time-lock located within said inner compartment and guarded by said inner door and mechanism extending out from the inner compartment into the space adjacent to the outer door, by which the time-lock is enabled to dog the said train-bolts of the outer door, substantially as described.

3. The combination, with a safe or vault having exterior and interior doors and bolt-works located thereon, respectively, of a time-lock within the compartment secured by the inner door, and intermediate mechanism whereby the train-bolts of the exterior and interior doors are both held in their locked position by the time-lock, substantially as described.

4. A safe or vault provided with outer and inner doors, either or both of which are provided with combination-locks and a time-lock located within the compartment guarded by the inner door, and intermediate mechanism associating the bolt-work with the time-lock, whereby the train-bolts of the exterior and interior doors are both held in their locked position by the time-lock and with or without the employment of the combination-locks, substantially as described.

5. A safe or vault provided with outside and inside doors, a time-lock located within the compartment secured by the inner door, an arbor adapted to throw the train-bolts of the inner door and by a further movement in the same direction to bring the time-lock in operation, and mechanism connected with the exterior door adapted to engage said arbor and impart a further revolution to it by the movement which throws the train-bolts of the outer door into their locked position, whereby the train-bolts of both doors are guarded by the time-lock, substantially as described.

6. In a safe or vault having exterior and interior doors and a time-lock located within the compartment secured by the inner door, said inner door provided with an arbor adapted to throw the train-bolts of said inner door into their locked position and admit of a further motion in the same direction for bringing the time-lock into operation, a bell-crank or equivalent mechanism engaged with the bolt-work of the outer door and a projection rotated or moved by said bell-crank mechanism, said projection adapted to engage and give the said further movement to the arbor of the inner door to bring the time mechanism into operation, substantially as described.

7. In a safe provided with a time-lock, an arbor engaged with the bolt-work and adapted by a partial turn to throw the train-bolts into locked position, where they may be secured by a combination-lock, and by a further turn of the arbor to bring the time-lock into operation to dog the train-bolts, substantially as described.

8. A safe provided with a time-lock mechanism for throwing the train-bolts into their locked position and for bringing the time-lock into operation by a further movement in the same direction, said mechanism consisting of an arbor with two arms, one of said arms engaged with the train-bolts of the door to which the arbor is attached and the other with a tongue-piece which engages the bolt of the time-lock, the connections with the arms of the arbor being by slot-and-pin or equivalent connections, substantially as described, said mechanism adapted to first move the train-bolts to their locked position, then with a further turn of the arbor, and without disturbing the train-bolts, to engage the tongue-piece with the bolt of the time-lock, substantially as described.

9. In a safe provided with a time-lock and an arbor adapted to throw the bolts into their locked position and by a further movement in the same direction to bring the time-lock mechanism into operation, a collar having a slot or orifice therein, and a spring-pawl located on said arbor and engaging the slot or orifice in the collar, the same serving to limit the throw of the arbor to a distance necessary for moving the train-bolts to their locked position and admitting of disengagement to permit the arbor to be further rotated to bring the time-lock into operation, substantially as described.

10. The combination, with a safe or vault having inner and outer doors with a considerable space between them and a time mechanism located within the compartment closed by the inner door, as described, of an elongated projection upon the outer door adapted to engage the arbor of the inner door, said projection adapted to be folded or otherwise displaced, so as to be out of the way when not in use, substantially as described.

11. The combination, with a safe or vault provided with outer and inner doors, said doors having train-bolts thereon, and a time-lock located within the space guarded by the inner door, of a projection upon the train-bolt work of the outer door engaging the arbor of the inner door, as described, said projection and arbor being relatively constructed to permit the projection to have a free longitudinal movement beyond the point necessary for its proper engagement, whereby an explosion upon the exterior would fail to produce any longitudinal pressure upon said projection, substantially as described.

In testimony whereof I sign this specification in the presence of two witnesses.

DAVID O. PAIGE.

Witnesses:
M. B. O'DOGHERTY,
JAMES L. NORRIS.